June 25, 1935. C. T. WALTER 2,006,091
CONVEYER
Filed April 11, 1932 2 Sheets-Sheet 1

Charles T. Walter
INVENTOR

WITNESS

BY
ATTORNEY

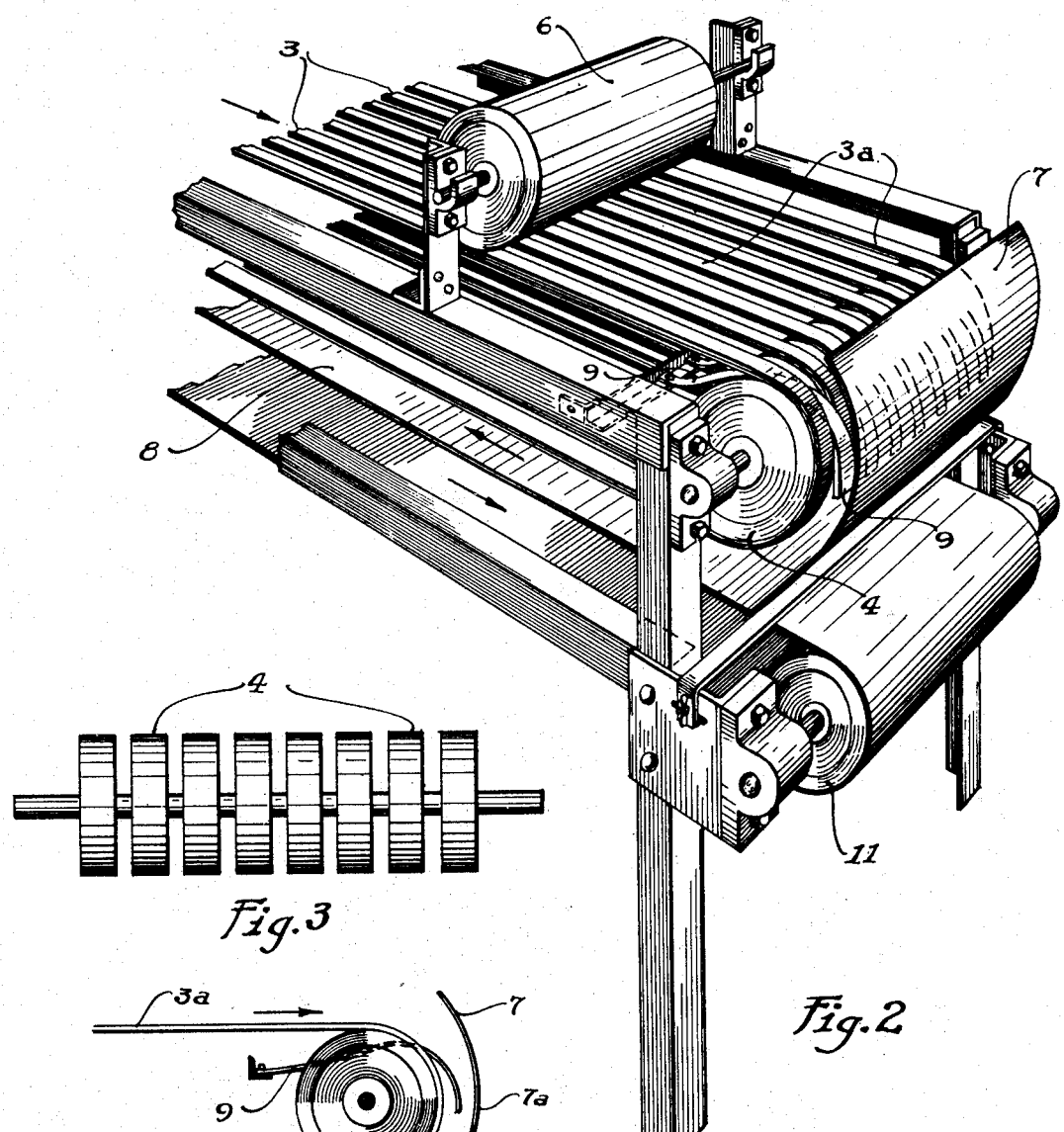
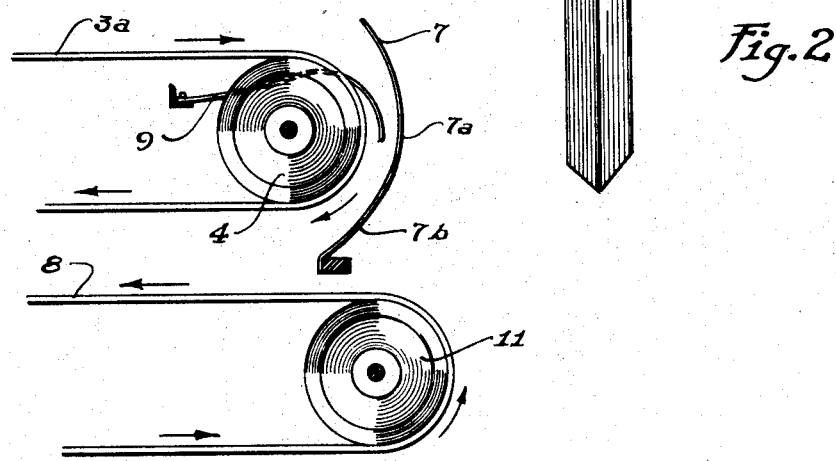

Patented June 25, 1935

2,006,091

UNITED STATES PATENT OFFICE 2,006,091

CONVEYER

Charles T. Walter, Chicago, Ill., assignor, by mesne assignments, to Industrial Patents Corporation, Chicago, Ill., a corporation of Delaware Application April 11, 1932, Serial No. 604,361

9 Claims. (Cl. 146—94)

The invention, according to one aspect thereof, relates to a food slicing machine and particularly to a bacon slicing machine, having an endless conveyer associated therewith so as to receive the slices of food, such as bacon, preferably in spaced group or batch arrangement, and which endless conveyer is of such length and is so constructed that a sheet or sheets of wrapping material, as paper, can be placed upon or applied to the top of the bacon slices, to wit, at the top of each group or batch of bacon slices, either before or after inspecting, and as the upper strand or chord of the conveyer moves horizontally and in a forward direction, so that pressure can be applied through the paper to the groups or batches of bacon slices to "weld" or press them in firm sticking together relationship, so that thereafter the pressed-together batches are fed horizontally and forwardly to a fixed inverting mechanism and so that there is means for positively forcing the stuck together batches from the conveying mechanism to the inverting mechanism.

The invention according to another aspect thereof relates to an endless conveyer which is provided by transversely spaced endless conveyer members or elements upon which the bacon strips are delivered in overlapping arrangement and with which conveyer there is provided a transversely arranged pressing member preferably in the form of a horizontal transversely extending roller which is arranged so as to exert downward pressure on batches of bacon as moved longitudinally along and under the roller by the conveyer.

The invention according to another aspect thereof, relates to the employment with an endless conveyer composed of transversely spaced endless conveying elements, of a series of members that project into the spaces between the conveying elements and therefrom in a manner to positively eject or force from the conveyer slices of bacon as they are moved along by the conveyer and particularly when the slices are opposite an inverting mechanism which is operatively associated with the forward end of the endless conveyer.

With these and other objects in view, the invention consists in the novel method, construction, combination and arrangement of parts hereinafter fully described, illustrated in the accompanying drawings, and pointed out in the claims hereto appended, it being understood that various changes in the form, proportion, and minor details of construction, within the scope of the claims, may be resorted to without departing from the spirit or sacrificing any of the advantages of the invention.

As illustrating a specific manner in which the invention may be realized, and a specific apparatus for realizing the invention, reference will be made to the accompanying drawings, forming part of this application, and in these drawings:

Fig. 2 is a perspective view of the forward end of the conveying system shown in Fig. 1.

Fig. 3 is a view showing the pulley element employed in the machine shown in Figs. 1 and 2.

Figure 1:
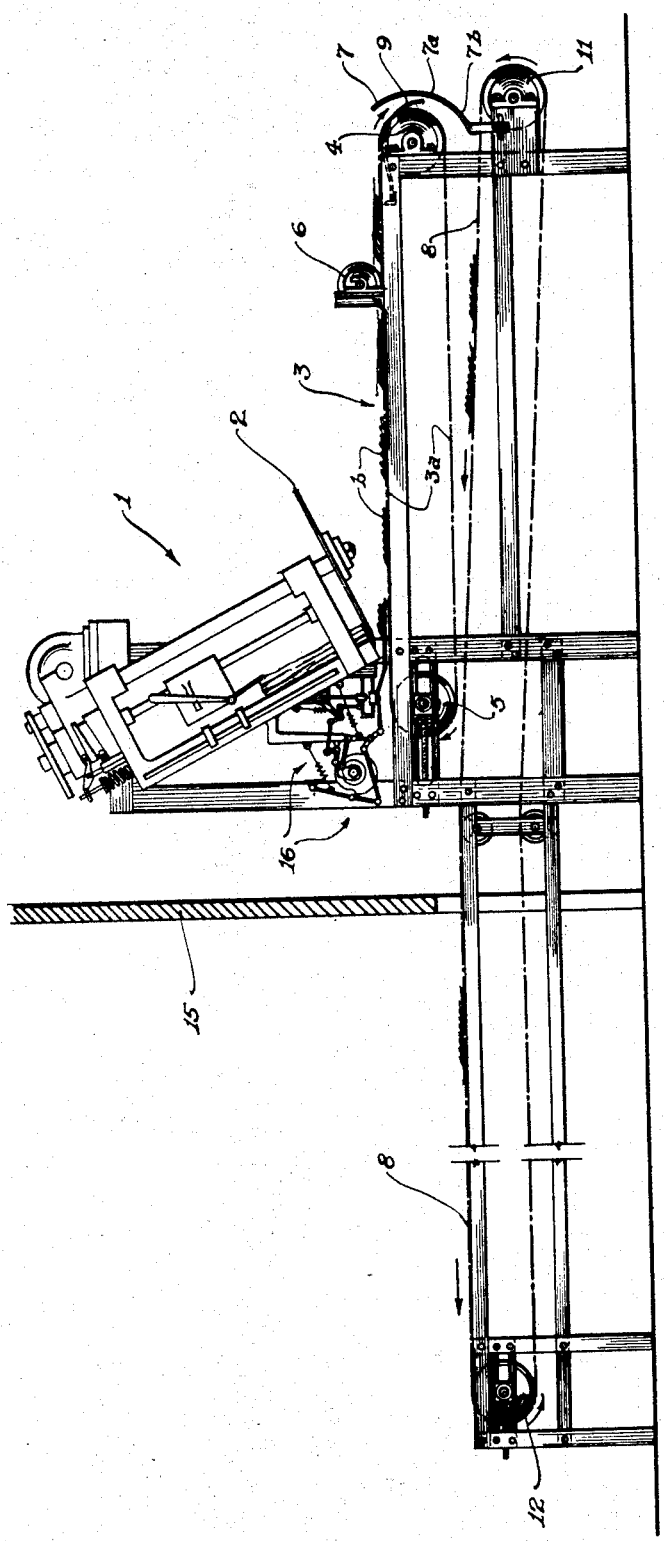
Figure 1 is a vertical longitudinal diagrammatic view showing a downwardly and forwardly inclined bacon slicing machine and in association therewith a conveying system arranged to receive sliced bacon delivered thereto from the slicing machine.

Fig. 4 is a cross sectional view through pulley element 4 showing inverting elements 7 and 9.

Referring now in detail to the drawings, 1 indicates a slicing machine unit having a knife 2 at the forward delivery end thereof. The machine shown occupies a downwardly and forwardly inclined position and may be of the type shown and described in my application, Serial No. 543,499, filed June 11, 1931, and entitled Slicing machine. It will be understood, however, that as far as the broader aspects of the present invention are concerned, it is not limited to the particular machine and inclined arrangement, because other types of food slicing machines can be employed.

The conveying arrangement comprises an initial receiving mechanism, preferably in the form of an endless conveyer 3, and the slicing machine and the conveyer arrangement are preferably operated in conjunction with each other and in such a manner that the slices of bacon, indicated as b, are delivered to the initial conveying mechanism in group arrangement, with the groups having gaps between them, but in which the slices of the several groups are on or in overlapping arrangement in respect to each other. The conveying system as a whole, as shown in Fig. 1, comprises the initial receiving mechanism 3, the inverting mechanism 7, and the final receiving and conveying mechanism 8.

The initial receiving mechanism 3 comprehends endless conveying elements 3a preferably of the multiple strand type, and which may be made of metallic tapes, fiber belts, or even chains or ropes. These endless conveying elements, however, may be provided by a single section deeply corrugated. These conveyer elements or conveyer element 3ª run over the front pulley element 4 and back pulley element 5. These or this endless conveyer element is sometimes referred to herein as an initial receiving endless conveyer.

The inverting mechanism 7 is arranged at the front end of the initial receiving endless conveyer so as to provide a section 7ª which is arranged at and adjacent to the front end of the conveyer, and a section 7ᵇ that extends downwardly and rearwardly from the section 7ª in a manner whereby material delivered to the inverting mechanism is inverted prior to delivery from the inverting mechanism 7.

The final receiving conveying mechanism 8 comprises an endless conveyer, frequently herein referred to as the final receiving endless conveyer, and is sometimes referred to as the final receiving and delivering endless conveyer, because of the fact that it not only receives the bacon delivered to it by the inverting mechanism 7, but it also conveys and delivers the bacon or other material thus received to a suitable place for further inspection and wrapping, if desired. This final receiving endless conveyer travels on front and rear pulley elements 11 and 12, and extends rearwardly, as compared with the initial receiving conveyer, quite a substantial distance, in order to provide space for inspection prior to ultimate wrapping.

One part of the conveying system may be located in what is known as the slicing room and another part will extend into the wrapping room, separated from the slicing room by a partition indicated at 15.

An inspection of Fig. 1 will make it clear that there is considerable space between where the knife delivers slices of bacon to the conveying mechanism and the inverting mechanism 7. This space is sufficient to permit inspection of slices and also to provide a space whereat wrapping material in sheet form, such as paper or other sheet material, can be placed on the tops of the successive groups or batches of bacon. It will also be observed from an inspection of Figs. 1 and 2 that there is provided a transverse roller 6 which extends transversely the full width of the conveying element 3ª. The function of this roller is to engage the top of the wrapping sheet and to press downwardly against the wrapping paper and therethrough to press the several strips of bacon on or in overlapping arrangement with respect to each other, in order to effect a "welding" or firm sticking together of the slices in each batch or group. This pressing of the assembled paper and bacon can be accomplished by any suitable means similarly located, but it is preferably accomplished while the batches of bacon are still upon the straight chord or lobe section or sections of the initial conveying member, and while the assembled batch is being moved longitudinally and forwardly toward said delivery section.

At the forward end of the initial receiving conveying mechanism there are provided interspaced fingers or members 9 which extend into and from the space between the strands 3ª, and the purpose of these fingers is to forcibly remove the bacon from the conveyer elements 3ª should there be any tendency for the bacon to adhere thereto. These interspaced fingers 9, therefore, tend to direct the assembled batches towards and against the inverting mechanism 7 and it will be observed that before the assembled batch leaves the inverting mechanism it has been inverted, whereby the paper is at the bottom and the pressed-together slices of bacon thereupon are at the top. From the inverting mechanism these inverted assembled batches pass to the receiving and delivering conveyer and it will be manifest that at the rear end of this conveyer they are arranged in position for further inspection and final wrapping.

The gap forming means 16 is described and claimed in my co-pending application, filed July 25, 1932, Serial No. 624,415.

What is claimed is:

1. The combination with an inclined slicing machine of an initial receiving conveyer having a series of transversely spaced endless conveying and supporting elements each providing top lobes that travel longitudinally in a forward horizontal path towards an inverting mechanism, said inverting mechanism and means comprising an endless final receiving conveyer having a top lobe that travels rearwardly and in a longitudinal direction beyond the rear end of the initial receiving conveyer, the inclined slicing machine being arranged and operated so that the lower cutting end of the machine deposits successive slices transversely on and across the spaced top lobes of the initial receiving conveyer but with certain of the successive slices in longitudinal overlapping arrangement with respect to the slice immediately preceding, said initial receiving conveyer having operatively associated therewith means for pressing together the overlapping slices and also having associated therewith means entering and extending from the spaces between the spaced endless conveying and supporting elements and arranged so as to forcedly eject from said conveying elements the pressed-together overlapping slices, the inverting member being associated with the forward end of the receiving conveyer to deliver the pressed-together slices while in an inverted position to and upon the endless final receiving conveyer.

2. In combination with a bacon slicing machine an initial receiving conveyer having a series of transversely spaced endless conveying and supporting elements collectively providing a top lobe section that travels in a forward direction towards an inverting mechanism, said inverting mechanism, and means comprising an endless delivering conveyer having a top lobe section that travels in a rearward longitudinal direction, which endless delivering conveyer extends rearwardly in a longitudinal direction past the initial receiving conveyer, said initial receiving conveyer having operatively associated therewith pressing means in the form of a transversely arranged pressing roller that is located above the several conveying strips and that is arranged so as to press sliced material on and as being conveyed by said strips, also associated with said initial receiving conveyer suitable means entering and extending from the spaces between said strips for the purpose of forcedly ejecting from said conveying strips the bacon carried thereupon, the inverting member being associated with the forward end of the receiving conveyer and having a portion extending downwardly, rearwardly and below the forward end of the receiving conveyer so as to deliver bacon received thereupon in an inverted position to and upon the endless delivering conveyer.

3. In combination with a bacon slicing machine for delivering slices of bacon in spaced batch arrangement to an initial or receiving conveyer, said receiving conveyer, having a series of transversely spaced endless conveying and supporting elements providing spaced top lobes that travel in a forward longitudinal path towards and to an inverting mechanism, said inverting mechanism, and a final receiving and delivering conveyer, said initial receiving conveyer having operatively associated therewith pressing means in the form of a transversely arranged pressing roller that extends across the top lobes of the transversely spaced endless conveying and supporting elements, also having associated therewith ejecting arms that enter and extend from the spaces between said spaced elements for the purpose of forcedly ejecting from said spaced elements the batches of bacon carried thereupon, the inverting member being associated with the forward end of the receiving conveyer and having a portion extending downwardly, rearwardly and below the forward end of the receiving conveyer so as to deliver bacon received thereupon in an inverted position to the final receiving and delivering means.

4. A slice manipulating device comprising a receiving conveyer, pressing means associated therewith, transfer means comprising a stripper adapted to remove groups of slices from said receiving conveyer after pressing, an inverter in operative relationship with said transfer means, and a conveyer adapted to receive said groups of slices from said inverter.

5. In combination two endless conveyers, transfer means therebetween, and a pressing roller spaced from said transfer means whereby groups of slices will be welded in a coherent group before transfer, said transfer means comprising a stripper to remove groups of slices from one conveyer and an inverter to receive said groups of slices from said stripper and deliver them to the other conveyer.

6. In a device of the class described an endless strand conveyer mounted upon pulleys, stripper fingers at one end of said conveyer emerging between the several strands thereof and an inverting slide positioned to receive material from said stripper fingers.

7. In combination, two endless conveyers, stripping means closely adjacent one end of one of said conveyers, and a fixed curved transfer means between said conveyers positioned to receive material from said stripping means, which transfer means acts as an inverter of the material being transferred.

8. In combination, two endless conveyers, stripping means closely adjacent one end of one of said conveyers and an inverting slide positioned to receive material from said stripping means to be discharged upon the second conveyer.

9. An endless conveyer mounted upon pulleys, a stripper mounted closely adjacent one end of the conveyer to strip material therefrom, and a fixed curved inverting member positioned to receive material from said stripper.

CHARLES T. WALTER.